UNITED STATES PATENT OFFICE.

CHARLES RANSON, OF PARIS, FRANCE.

PROCESS OF DECOLORIZING AND PURIFYING SUGAR JUICE OR SYRUP.

SPECIFICATION forming part of Letters Patent No. 623,105, dated April 11, 1899.

Application filed January 17, 1899. Serial No. 702,443. (No specimens.)

*To all whom it may concern:*

Be it known that I, CHARLES RANSON, a citizen of the Republic of France, and a resident of Paris, France, have invented certain new and useful Improvements in Processes of Decoloring and Purifying Sugar Juice or Syrup, of which the following is a specification.

In an application for United States Patent filed by Georges Ranson on June 12, 1897, under Serial No. 640,561, and patented, for instance, in British patent, A. D. 1896, No. 19,815, there is described a process for decoloring and purifying sugar-syrup by the use of hyposulphurous acid in a nascent state. The special means for producing this acid in this state there described is sulphur dioxide or sulphurous acid in the presence of zinc-powder.

Now I have discovered that the substitution of tin for zinc in the above-entitled process causes an improved purification and decoloration of sugar-juices. This is due to the fact that certain insoluble compounds of tin are formed by the reaction, which assist the purification. The best results are obtained when these compounds are formed in the body of the syrup itself.

In my process, therefore, I employ, instead of the zinc-powder referred to, pure tin, preferably in a finely-divided condition. Such pure tin, which should be freed from all foreign bodies and which especially should have no trace of oxidation, may be obtained chemically or by electrolysis or by mechanical means. In all cases, however, the pure tin, when obtained, should be preserved under a body of water or the like and be protected from the air to prevent oxidation.

My process of purifying sugar-syrup consists in sulphitizing the syrup by passing sulphur dioxide into the body of the juice or by adding sulphurous acid to the juice, the degree of sulphitization depending upon the nature of the product to be treated; in adding tin, preferably in the form of the paste referred to; in preferably stirring and heating the juice and in then filtering the juice to remove the insoluble impurities. The juice resulting from this filtration will have been purified and decolored.

The reaction which takes place when the tin is added to the syrup which has been treated with sulphur dioxide or sulphurous acid may be expressed as follows:

I. $2(H_2SO_3) + Sn = H_2SO_2 + SnSO_3 + H_2O$.

The hyposulphurous acid ($H_2SO_2$) being formed in a nascent state acts to decolor the syrup in a manner that is now well understood and that forms no part of my present invention. The hyposulphurous acid, however, reacting on the tin also forms stannous sulphide and thiosulphate of tin, as the following equation shows:

II. $3(H_2SO_2) + 2Sn = SnS + SnS_2O_3 + 3H_2O$.

The tin sulphide (SnS) here formed being insoluble and being formed in the body of the syrup in precipitating drags along with it organic and coloring matters found in the syrup, and thus acts to purify the syrup. It remains to see what becomes of the sulphite of tin ($SnSO_3$) produced in reaction I and of the thiosulphate of tin ($SnS_2O_3$) produced in reaction II.

As to the sulphite of tin ($SnSO_3$) I may say that the compounds of tin, like those of antimony and bismuth, can easily be separated by water in excess and by heat, as the following equation shows:

III. $SnSO_3 + 2H_2O = SnO.H_2O + H_2SO_3$.

From this last equation it appears that the sulphite of tin is decomposed into a hydrate of stannous oxide and sulphurous acid.

The thiosulphate of tin ($SnS_2O_3$) breaks up into sulphite of tin ($SnSO_3$) and sulphur (S.)

IV. $SnS_2O_3 = SnSO_3 + S$.

The tin sulphite thus formed breaks up as in reaction III, and the sulphur is fixed by the tin oxide which comes from the decomposition of the tin sulphite, as shown by reaction III.

It appears, therefore, that the substances which result from the reactions I and II ultimately resolve themselves into tin oxide and tin sulphide.

The tin oxide, like the tin sulphide, is insoluble and in precipitating mechanically drags with it organic and coloring matters found in the syrup, and thus acts to purify the syrup. Besides, the tin oxide, being formed in a nascent state, combines with certain organic acids, forming insoluble compounds in accordance with the following reaction:

Organic acid + SnO.H$_2$O = Organate of Sn + H$_2$O.

These insoluble compounds of tin will therefore be filtered off with the other insoluble substances.

It results, therefore, that in my process of treating sugar-syrup with sulphur dioxide or sulphurous acid in the presence of tin, stirring and heating the mass, and filtering that the resultant syrup which has passed through the filter has been purified and decolored, first, by the action of the hyposulphurous acid; second, by the mechanical effect of the tin oxide and the tin sulphide in dragging down mechanical impurities during their precipitation, and, finally, by the chemical action of the tin oxide in forming insoluble compounds with the organic acids, which insoluble compounds remain in the filter.

What I claim is—

1. The process of decoloring sugar juice or syrup which consists in treating the syrup with sulphur dioxide or sulphurous acid in the presence of tin, substantially as described.

2. The process of decoloring and purifying sugar juice or syrup which consists in first treating the syrup with sulphur dioxide or sulphurous acid and then adding tin to the solution, whereby are formed hyposulphurous acid in a nascent state and insoluble compounds of tin, each acting to purify the syrup in the manner described.

3. The process of decoloring sugar juice or syrup which consists in treating the syrup with sulphur dioxide or sulphurous acid and tin added to the solution and then filtering the syrup to remove the impurities, substantially as described.

In testimony whereof I have signed my name to this specification in the presence of two subscribing witnesses.

CHARLES RANSON.

Witnesses:
ADOLPHE SEGAY,
EDWARD P. MACLEAN.